(12) United States Patent
Leon

(10) Patent No.: US 11,611,295 B2
(45) Date of Patent: Mar. 21, 2023

(54) INFRASTRUCTURE CONVERSION, ADAPTION AND SYMBIOTIC STABILIZATION SYSTEM THEREOF

(71) Applicant: Stephen Alan Leon, Arlington, VA (US)

(72) Inventor: Stephen Alan Leon, Arlington, VA (US)

(73) Assignee: ALANDUSTRIES INCORPORATED, Arlington, VA (US)

( * ) Notice: Subject to any disclaimer, the term of this patent is extended or adjusted under 35 U.S.C. 154(b) by 271 days.

(21) Appl. No.: 17/026,230

(22) Filed: Sep. 20, 2020

(65) Prior Publication Data

US 2021/0050803 A1 Feb. 18, 2021

(51) Int. Cl.
*H02N 10/00* (2006.01)
*G06Q 50/30* (2012.01)
*G06Q 50/02* (2012.01)

(52) U.S. Cl.
CPC .............. *H02N 10/00* (2013.01); *G06Q 50/02* (2013.01); *G06Q 50/30* (2013.01)

(58) Field of Classification Search
CPC ........ H02N 10/00; G06Q 50/02; G06Q 50/30; Y02P 90/84; Y02B 10/20; Y02E 70/30; E04H 14/00
See application file for complete search history.

(56) References Cited

U.S. PATENT DOCUMENTS

| 8,942,338 B2 | 1/2015 | Ahlfeld et al. |
| 10,197,338 B2 * | 2/2019 | Melsheimer ............ E04H 14/00 |
| 11,219,165 B1 * | 1/2022 | Meng .................... B62D 15/025 |
| 2002/0064692 A1 | 5/2002 | Johnson |
| 2011/0010208 A1 | 1/2011 | Yekutiely et al. |
| 2011/0036919 A1 | 2/2011 | Baird |
| 2011/0081586 A1 * | 4/2011 | McAlister ................. C25B 1/00 429/422 |
| 2018/0347406 A1 * | 12/2018 | Friesth .................... F24S 25/50 |

FOREIGN PATENT DOCUMENTS

WO 2013/054156 A1 4/2013

OTHER PUBLICATIONS

Northam: "Executive Order Number Forty-Three (2019)", https://www.governor.virginia.gov/media/governorvirginiagov/executive-actions/EO-43-Expanding-Access-to-Clean-Energy-and-Growing-the-Clean-Energy-Jobs-of-the-Future.pdf, retrieved from the Internet on Sep. 27, 2020.

(Continued)

*Primary Examiner* — Michael C Zarroli
(74) *Attorney, Agent, or Firm* — Nath, Goldberg & Meyer; Jerald L. Meyer; Morgan D. Rosenberg

(57) ABSTRACT

A system to sustain and develop a terrestrial and extraterrestrial economy is provided. A thermodynamic energy component is provided for generating electricity and is in electrical communication with a distributing power grid. A dynamic electrical charging matrix with transportation systems, a habitat, an irrigation and agriculture topology and resources for manufacturing recycling provisions are each also in electrical communication with the distributing power grid. An auxiliary depot is further provided for auxiliary storage of energy-related resources.

6 Claims, 2 Drawing Sheets

(56) References Cited

OTHER PUBLICATIONS

Terrapower LLC: "Terrapower's Traveling Wave Technology: Bringing Advanced Nuclear to Market", https://www.terrapower.com/wp-content/uploads/2020/08/TP_2020_TWR_Technology_082020.pdf, retrieved from the Internet on Sep. 19, 2020.
Carbon Clean Solutions, Ltd.: "C02 Reuse, Recovery, Removal", retrieved from Internet: "https://carboncleansolutions.com" on Feb. 12, 2020.
Delventhal: "Carbon Sequestration and the Ocean How will our waters react?", retrieved from Internet: "https://namepa.net" on Feb. 12, 2020.
Wikipedia: "Arecaceae", retrieved from Internet: "https://en.wikipedia.org/wiki/Arecaceae" on Feb. 12, 2020.
Qualcomm: "From wireless to dynamic electric vehicle charging: The evolution of Qualcomm Halo", retrieved from Internet: https://www.qualcomm.com/news/onq/2017/05/18/wireless-dynamic-ev-charging-evolution-qualcomm-halo on Feb. 12, 2020.
Nissan: "In-wheel motor", retrieved from Internet: "https://www.nissan-global.com/EN/TECHNOLOGY/OVERVIEW/in_wheel_motor.html" on Feb. 12, 2020.
Bluesky Energy: "Greenrock Saltwater Battery", retrieved from Internet: "https://www.bluesky-energy.eu/en/saltwater_battery/" on Feb. 12, 2020.
Alandustry LLC, et al.: "ICASST™", https://www.facebook.com/alandustry/, retrieved from Internet Sep. 20, 2020.
Terrapower LLC, et al.: "TerraPower and GE Hitachi Nuclear Energy Introduce Commercial Natrium™ Power Production and Storage System", https://www.terrapower.com/terrapower-and-ge-hitachi-nuclear-energy-launch-natrium-technology/, retrieved from Internet Sep. 20, 2020.
Power Grid International: "Next-Gen Grid Architecture: A prerequisite for grid modernization", https://www.power-grid.com/, retrieved from the Internet on Sep. 9, 2020.
Popular Mechanics: "30 Years Later, This Big Boy Fusion Reactor Is Almost Ready to Turn On", https://www.popularmechanics.com/science/a30705490/nuclear-fusion-iter-reactor-tokamak/, retrieved from the Internet Sep. 9, 2020.
Exxonmobil: "Carbon capture and storage (CCS)", https://corporate.exxonmobil.com/Research-and-innovation/Carbon-capture-and-storage, retrieved from the Internet on Sep. 20, 2020.
nature.com: "Temporary reduction in daily global CO2 emissions during the COVID-19 forced confinement", https://www.nature.com/articles/s41558-020-0797-x/, retrieved form the Internet on Sep. 13, 2020.
Microtron Technologies: "Drawbacks of Current Technologies", http://www.microtrontec.com/technologies.php/, retrieved form the Internet on Sep. 13, 2020.
Science Direct: "Embodied Carbon", https://www.sciencedirect.com/topics/engineering/embodied-carbon, retrieved from the Internet on Sep. 20, 2020.
Siemens: "Driving energy intelligence", https://new.siemens.com/global/en/products/energy/topics/smart-grid.html, retrieved from the Internet on Sep. 20, 2020.
Only Natural Energy: "The true carbon footprint of photovoltaic energy", https://www.onlynaturalenergy.com/the-true-carbon-footprint-of-photovoltaic-energy/, retrieved form the Internet on Oct. 11, 2020.
crossfirefusion.com: "Corss Fire Fusion Reactor", http://www.crossfirefusion.com/nuclear-fusion-reactor/crossfire-fusion-reactor.html, retrieved form the Internet on Oct. 11, 2020.
crossfirefusion.com: "Multiphase Thermoelectric Converter", http://www.crossfirefusion.com/thermal-to-electrical/multiphase-thermoelectric-converter.html, retrieved from the Internet on Oct. 11, 2020.
World Nuclear Assocaition: "Nuclear Reactors and Radioisotopes for Space", https://www.world-nuclear.org/information-library/non-power-nuclear-applications/transport/nuclear-reactors-for-space.aspx, retrieved from the internet on Oct. 11, 2020.
Composites World: "Filament wound utility poles offer design flexibility", https://www.compositesworld.com/articles/filament-wound-utility-poles-offer-design-flexibility, retrieved form the Internet on Oct. 11, 2020.
Newsom: "Executive Order N-79-20", "https://www.gov.ca.gov/wp-content/uploads/2020/09/9.23.20-EO-N-79-20-text.pdf", retrieved form the Internet on Sep. 27, 2020.
Beyer: "Letter dated Apr. 24, 2020", electronically mailed to alandustries@gmail.com on Apr. 24, 2020.
Quartz: "A 1912 news article ominously forecasted the catastrophic effects of fossil fuels on climate change", https://qz.com/817354/scientists-have-been-forecasting-that-burning-fossil-fuels-will-cause-climate-change-as-early-as-1882/amp/, retrieved from the Internet on Oct. 1, 2020.

* cited by examiner

INFRASTRUCTURE CONVERSION, ADAPTION AND SYMBIOTIC STABILIZATION SYSTEM THEREOF

CROSS REFERENCE TO RELATED APPLICATIONS

This application claims the benefit of U.S. Provisional Patent Application No. 62/907,731, filed on Sep. 30, 2019, the disclosure of which is incorporated herein by reference.

INVENTION FIELD

The invention aggregates technological phenomena that will sustain an economy on either a terrestrial or extraterrestrial habitat; as a complete viable system. Hereby disclosed, applicant believes a new and useful instrument under 18 U.S.C. § 1839(3)(A) has been assembled, without waiver, except reasonably necessary under 18 U.S.C. § 1839 ((3)A) (B) and (7)). Whereas, some trade secrets, will be principled foremost with regards to any safety protocols and liabilities that may or may not impact society and the environment with implementation of the ICASST™ industrial project.

BACKGROUND

It cannot be ruled out that Planet Earth's atypical oscillation of meteorological patterns, at present, are possibly due to the natural offset of said Planet's fifth interglacial developmental cycle. To the contrary, empirical data concerning the advent of the Industrial Revolution has shown that an imbalance of $CO_2$ displaced into Earth's ecosystem, by an interconnected economy, has initiated a climate change. Considering both postulations, would explain the more recent observations towards exponential and unexpected rates of a climate change, any of which will render an economy unsustainable. The invention will allow economical progress in any environment, thereby negating any moot points of a climate change, while responsibly advancing space-faring endeavors.

DESCRIPTION

Figure 1:
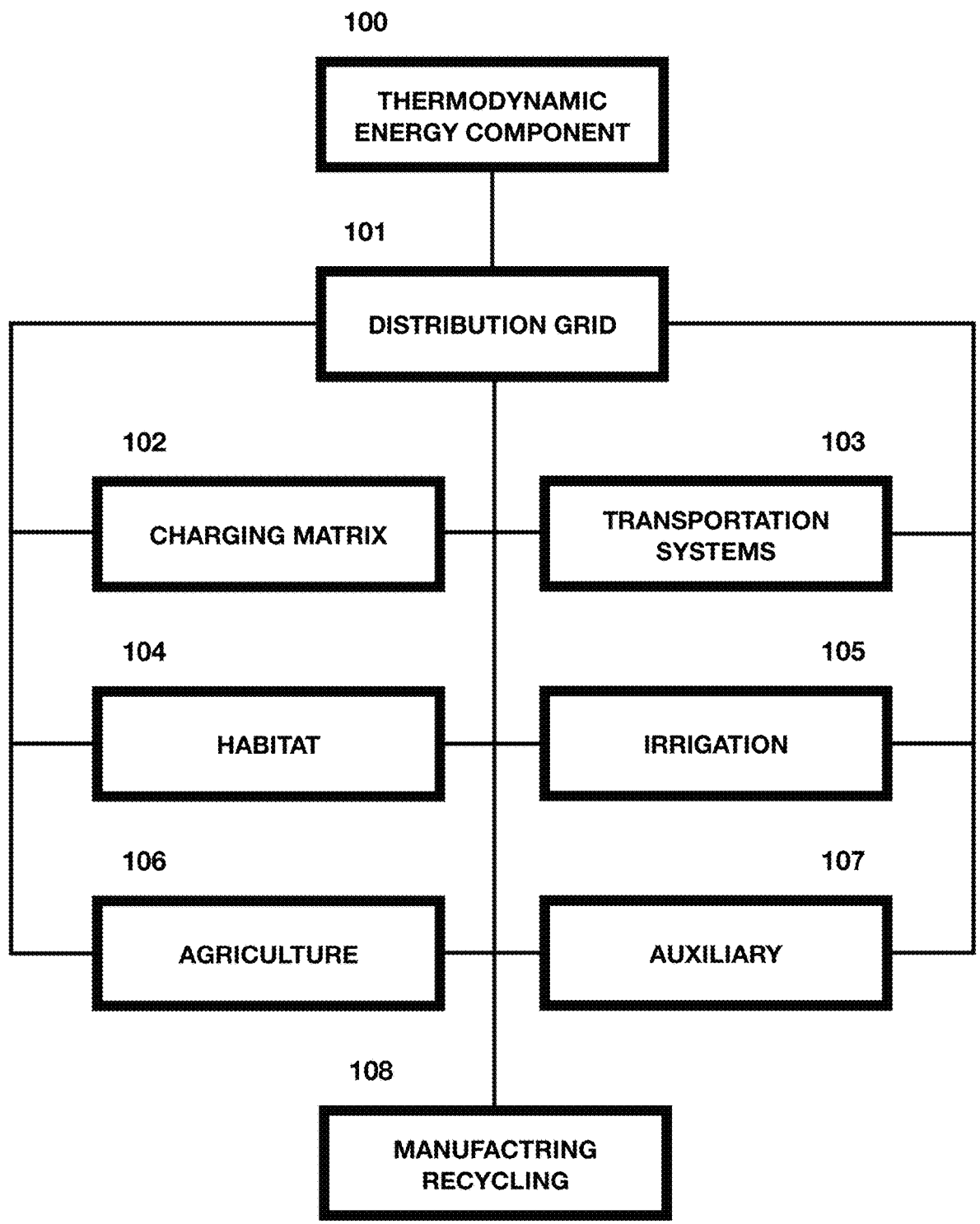
FIG. 1 diagrammatically illustrates system components of a symbiotic stabilization system for infrastructure conversion and adaption.
Figure 2:
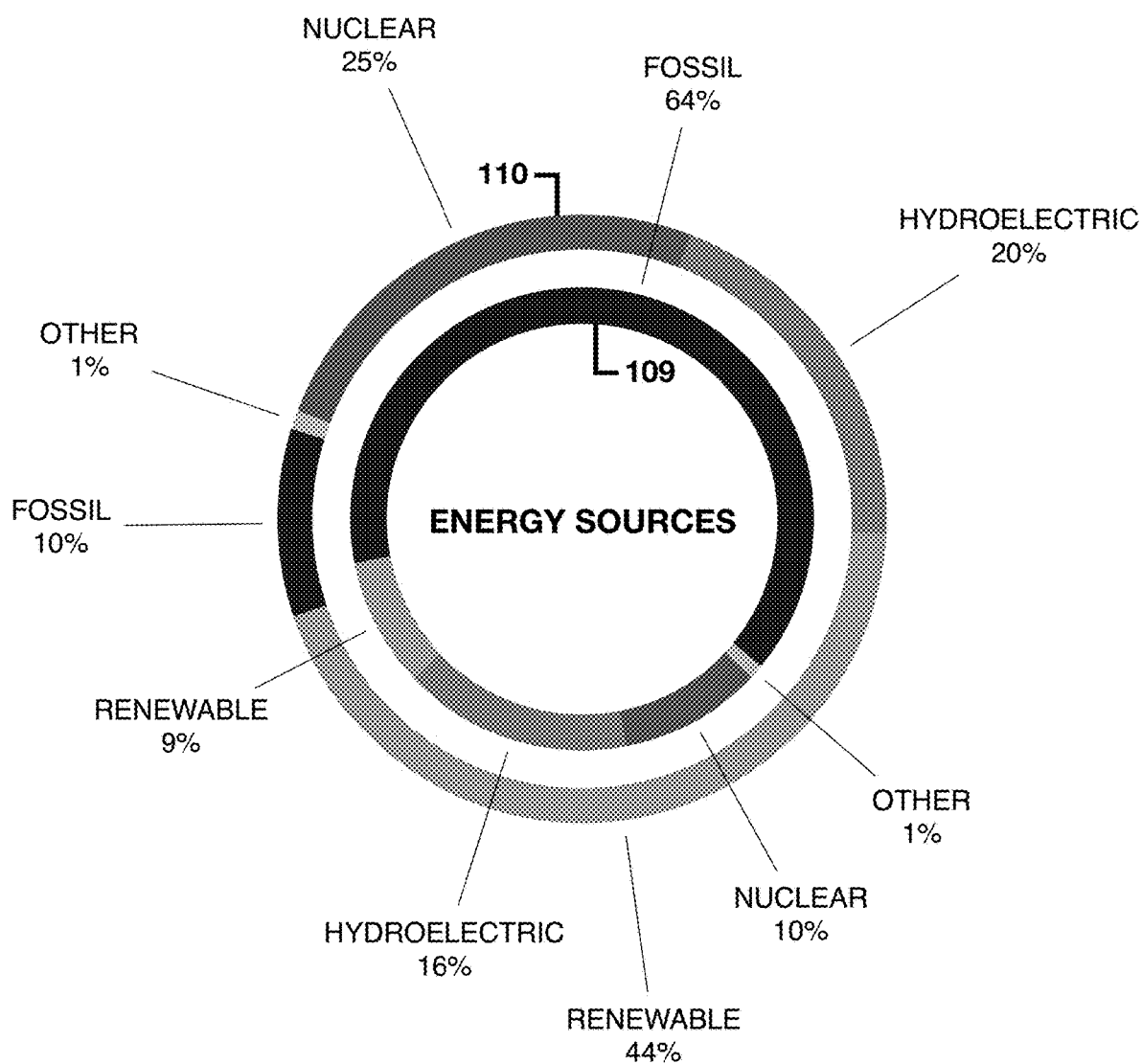
FIG. 2 diagrammatically illustrates the planet Earth's total resources consumed by present infrastructure along with proposed energy conversions of this infrastructure.

In the following detailed description, reference is made to the accompanying prior art. Within the entirety of the disclosed subject matter, Applicant defines the nomenclature of energy technology into three designating color classes: the Red Technology Class (hereinafter RTC)—any thermodynamic device that converts heat to electricity; the Black Technology Class (hereinafter BTC)—any device that has procured Fossil Fuels for use in any device that also combusts derivates therefrom, to include carbon (hereinafter C) innovation; and the Green Technology Class (hereinafter GTC)—any device that synthetically or semi-synthetically converts electricity from light, biochemistry, geological kinetics or combination thereof.

The system primarily relies on electricity converted from a Thermodynamic Energy Component 100 as a preliminary power source. Specifically, later generation Nuclear Technology designs that primarily utilize spent fuel from obsolete reactors such as Uranium or natural Uranium, as shown in U.S. Pat. No. 8,942,338 B2 (AHLFELD, et. al), which is sufficient for this system and by definition, sub-classed as renewable energy within the RTC. It is known that Depleted Uranium is no more volatile than lead and such fuel allows near zero carbon emissions. Such reactors and their safety have been developed by those skilled in the art and are " . . . walk away safe . . . ". The Traveling Wave Reactor (hereinafter TWR) is currently in developmental stages, a Molten Chloride Fast Reactor proves a viable component for the immediate future. The electricity produced with 100 is then distributed though a capable Power Grid 101. Further integration of a thermo-electrochemical device, such as US-2002/0064692-A1 (JOHNSON), will complement this system.

The distinction of the aforementioned preliminary power source is predicated on the energy producing device and resourcing in an infrastructure (109 or 110). Components allow this system any technological upgrades while much of the present infrastructure remains unchanged. Thus, a suggested 15% increase of the RTC, modular or the like, to eventually replace obsolete Nuclear Reactors of the present infrastructure. The upgrades will offset the aforementioned variable of a climate change (from the advent of the Industrial Revolution). Eventually, the International Thermonuclear Experimental Reactor (ITER) will become the primary power component of the herein system.

International conflict in regards to the weaponization from developing nuclear technology professes resolution with a TWR and ICASST™. Many countries routinely denuclearize with consideration to the shelf-life of some nuclear arms, which renders Uranium isotopes and derivatives inoperable as weapons. This provides an abundance of Uranium, which otherwise would have little use than stockpiled waste. Many countries will benefit from the usage of advanced nuclear energy and not the proliferation of weapons from nuclear research and development with this system.

The RTC will manufacture most if not all forms of the GTC, thereby offsetting Fossil Fuel consumption, to an approximate 10% total, with concurrent upgrades to carbon capturing manufacturing facilities and protocols. The BTC is expected to sustain and grow moderately in the global and space-faring marketplaces. Procurement of organic or inorganic materials in the BTC would most benefit from next-generation recycling 108 programs and innovations therein (such as C comprised utility poles which incur Real Property value, in an economy, therewith). Heavy BTC machinery will still be required to function industry, in the foreseeable future, to include the maintenance and development of asphalt for roadways.

With observation to the recent mitigation of the present COVID-19 pandemic, the inefficiency of energy sourcing Fossil Fuels is apparent in the present and obsolete infrastructural system 109, which supply chains are easily disrupted. The benefits again of a TWR are purported as " . . . walk away safe . . . ". Therefore, achieving overall safety and health of society in any future pandemic, in regards to social distancing. Further, recent measuring of $CO_2$ shows some economical impacts of the BTC, amidst the COVID-19 crisis.

It is not sufficient to implement the GTC with the present Infrastructure 109 which will increase carbon emissions from manufacturing. The subject matter herein solves the postulation and expedites necessary implementation therefrom. The RTC does not rely on battery-storage or natural elements such as Sunlight, Wind, or other geological phenomena to operate without interruption (with exception in a TWR); much of the GTC relies on these phenomena. Therefore, the RTC will be required to power some if not most general residential and commercial utility applications, to aggregate the GTC in this system (as a preliminary power source).

No disruption to an economy is expected from the significant decrease in Fossil Fuel consumption purported in this system. Innovation in the BTC is important and a necessary pivot. Offshore drilling for example, will simply delegate to oceanic sequestration and farming. Further, atmospheric sequestration will be organically achieved by plant life. Notably, the cultivation of the Arecaceae plant. Throughout Planet Earth's long evolutionary history, such plant life are known to survive in many climate zones and sub-types and potential mixed-types in a climate change or post-crisis. The variety therein will also support wild-life such as birds. This requirement will replenish an ecosystem within the symbiotic habitat 104 of Planet Earth, by assisting crop diversity naturally; also know as micro-rainforests. The need for the RTC in this system is further apparent to power irrigation topology 105 to sustain agriculture 106 in any natural or synthetic environment. Such power in the RTC can pipeline water across both short and long distances, again, delegating form oil pipelines. As the energy sector advances, hybrid Red/Black/Green Technologies, or the Yellow Technology Class (hereinafter YTC), to include Hydroelectricity, are expected components.

Moderate growth in the BTC with a concurrent decrease of Fossil Fuel consumption is further achieved in the automotive industry by converting internal combustion surface vehicles by the following operands. One is embedding dynamic electric vehicle charging 102 into roadways 103 to include parking locale. The matrices in roadways under Faraday's law of electromagnetic induction replace obsolete wired-charging systems. Conjoining after-market installation of in-wheel electric motors and Lithium type (hereinafter, Li) batteries. However, it should be noted that Li based batteries may not be sustainable for this system. It is not presently known to the Applicant of the viability of Li as a finite or recycled resource and the plurality. Sustainable storage with carbon allotropes shows more sufficiency in this system. These advanced roadways allow safe and reliable automation of surface vehicles which will reduce traffic congestion, collisions and legal citations from human error. Therefore, reduction of liabilities and consumer costs therewith. Snow-faring environments will benefit as the aforementioned matrices generate heat, thereby decreasing excessive snow plowing, emergency routing and salting, which allowing an economy to sustain with little to no interruption, delay or cancellations.

Further, Fossil Fuels are known to be the decomposition matter of animal and plant life with geological causality. Planet Earth is the only known source of life in the Universe at present, thus, fossil fuels may be reasonably considered rare. The preservation of most BTC resources, with the exception of C innovation, may prove to be precious commodities, more so than any other naturally occurring element or compound, excluding diamonds. Heavy precious metals such as Gold and Platinum are scientifically postulated to be in abundance, along with C, within other planetary embodiments than Planet Earth; notably Asteroids—of the presently known Sun Solar System. Further, internal combustion devices are not sufficient in extraterrestrial space and corresponding embodiments, e.g., combustion requires O (oxygen). However, Hydrogen fuel (ionic-propulsion) may be supplemental and useful and effectuated along with electromagnetic-propulsion to escape velocity.

Disclosed in this Application, is the integration of the defined RTC, BTC and GTC, for a sustainable infrastructural system. This system also renders portability to extraterrestrial applications. An auxiliary depot 107 is designated for fail-safe intervention protocols under 18 U.S.C. § 1839 (3)(A) for any celestial embodiment as transferrable. In a transferable system, it is also not efficient to rely primarily on liquid fuels or solar panels for space exploration and colonization. Liquid fuel requires a greater cargo load and the energy is not as robust when compared with the RTC. Additionally, generated electricity is contingent to the physical size of any geometric photovoltaic framework attached to a spacecraft. Electrical output also decreases significantly the greater distance a photovoltaic apparatus is to a Star.

The invention will provide the usefulness of restoring balance from any presently known climate-change while concurrently creating permanent establishments in a solar system efficiently. To include procurement of organic materials from Asteroids and any extraterrestrial embodiment.

What is claimed is:

1. A system to sustain and develop a terrestrial and extraterrestrial economy, the system comprising:
   a thermodynamic energy component for generating electricity;
   a distributing power grid in electrical communication with the thermodynamic energy component;
   a dynamic electrical charging matrix embedded in roadways for charging vehicles, the dynamic electrical charging matrix being in electrical communication with the distributing power grid;
   a habitat in electrical communication with the distributing power grid;
   an irrigation and agriculture topology in electrical communication with the distributing power grid;
   means for manufacturing using recycled materials in electrical communication with the distributing power grid; and
   an auxiliary depot for storage of energy-related resources in electrical communication with the distributing power grid.

2. The system to sustain and develop a terrestrial and extraterrestrial economy as recited in claim 1, wherein the thermodynamic energy component comprises a nuclear reactor.

3. The system to sustain and develop a terrestrial and extraterrestrial economy as recited in claim 2, wherein the nuclear reactor is a fission reactor.

4. The system to sustain and develop a terrestrial and extraterrestrial economy as recited in claim 3, wherein the fission reactor is selected from the group consisting of a traveling wave reactor and a molten chloride fast reactor.

5. The system to sustain and develop a terrestrial and extraterrestrial economy as recited in claim 2, wherein the nuclear reactor is a fusion reactor.

6. The system to sustain and develop a terrestrial and extraterrestrial economy as recited in claim 1, wherein the thermodynamic energy component comprises a thermoelectrochemical device.

* * * * *